May 27, 1941.    J. VOGEL    2,243,614
APPARATUS AND METHOD FOR TREATING TUBULAR MEMBERS
Filed April 30, 1940    5 Sheets-Sheet 1
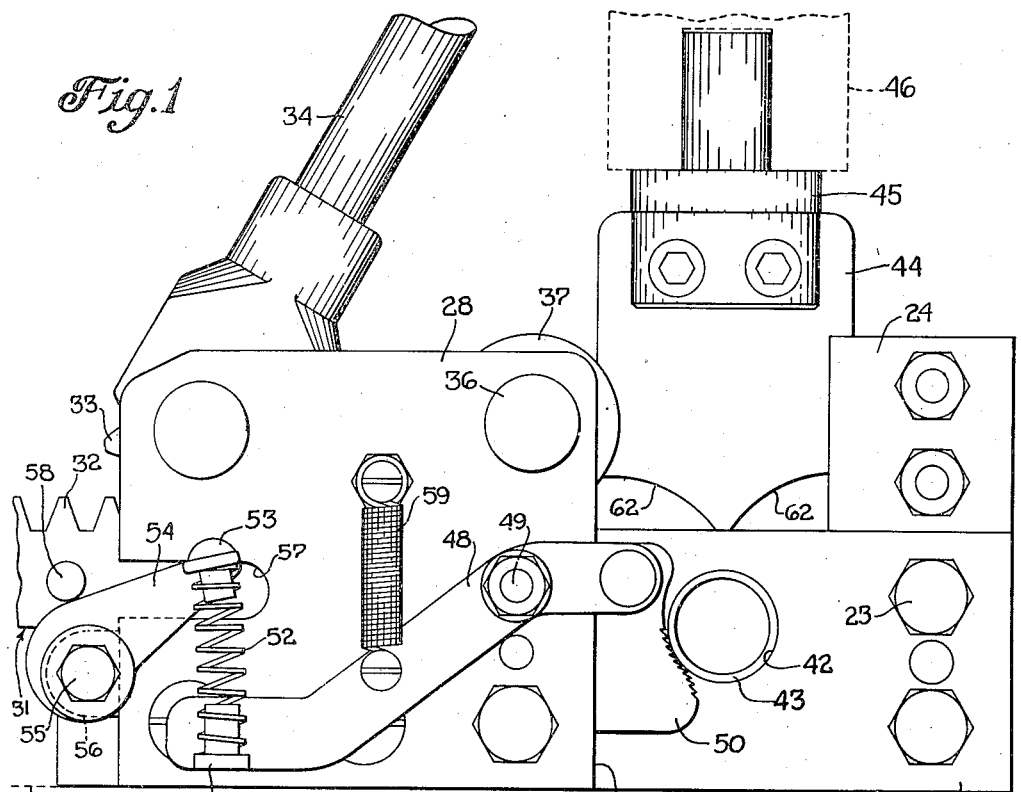
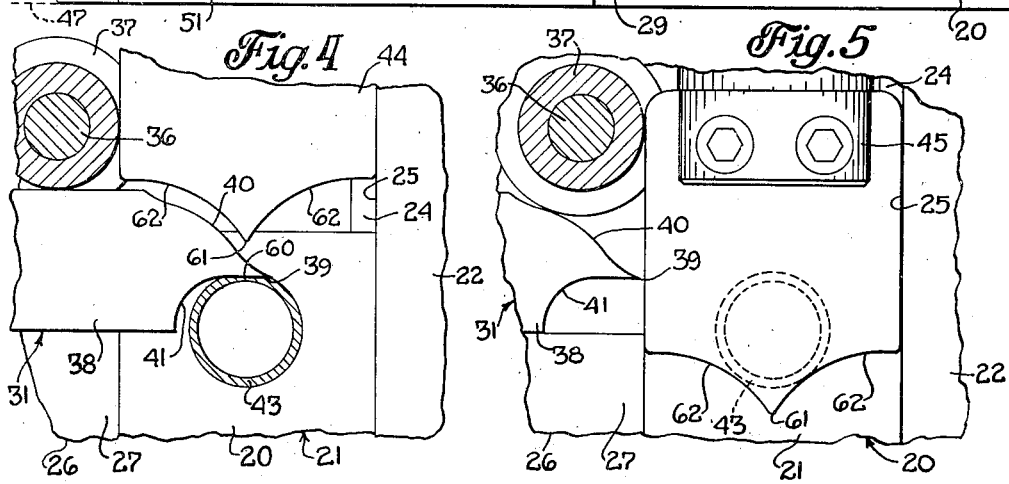
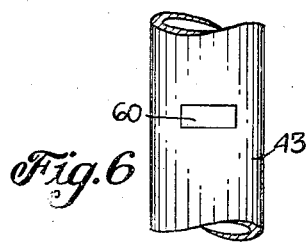
Inventor
Julius Vogel
By Harold W. Knoth
Att'y.

May 27, 1941. J. VOGEL 2,243,614
APPARATUS AND METHOD FOR TREATING TUBULAR MEMBERS
Filed April 30, 1940 5 Sheets-Sheet 2
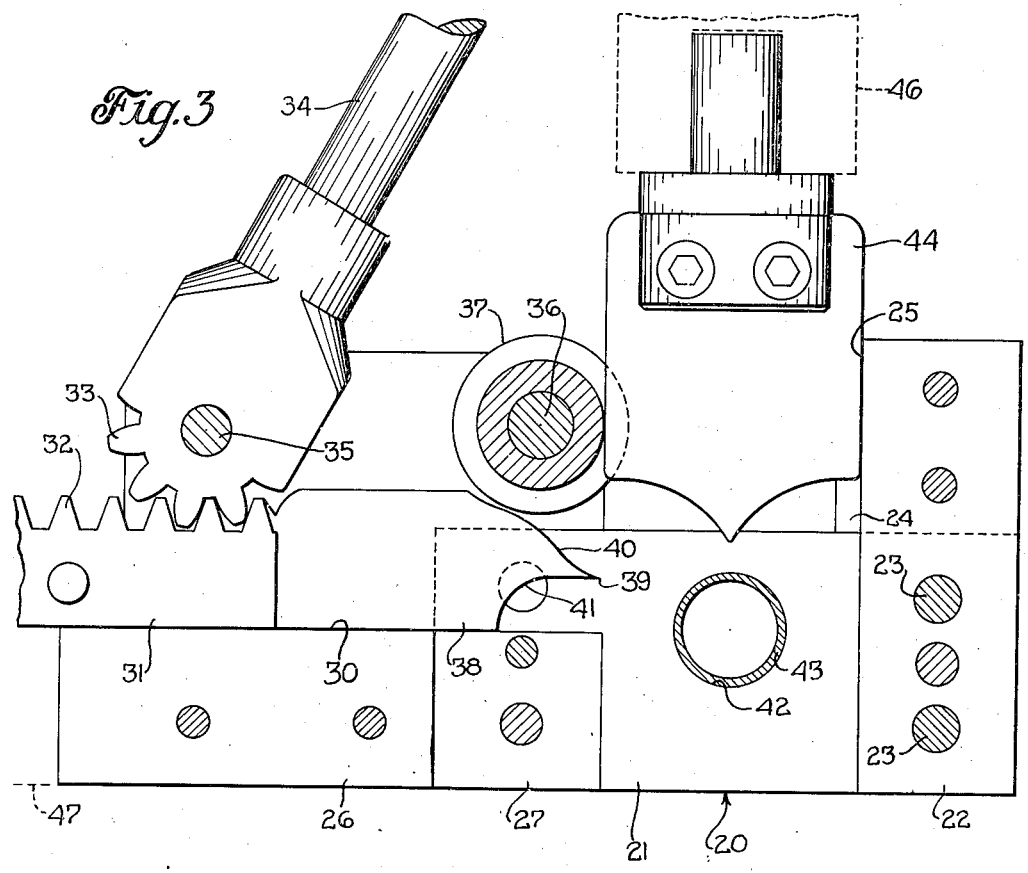
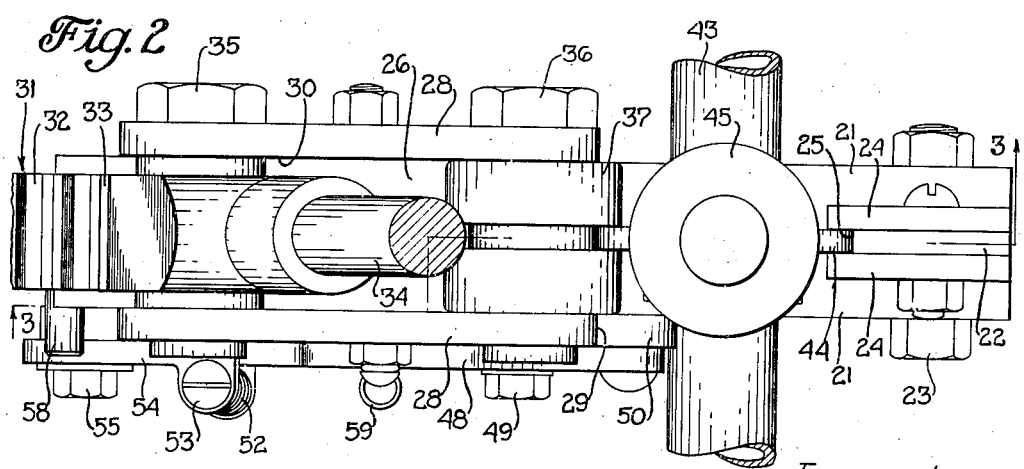
Inventor
Julius Vogel
By Harold W. Knott
Atty.

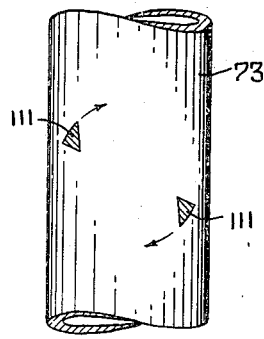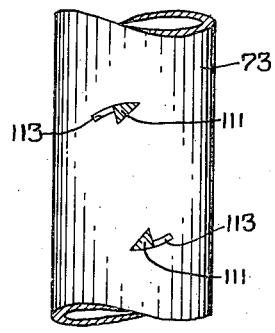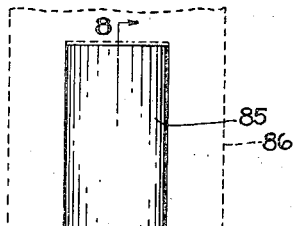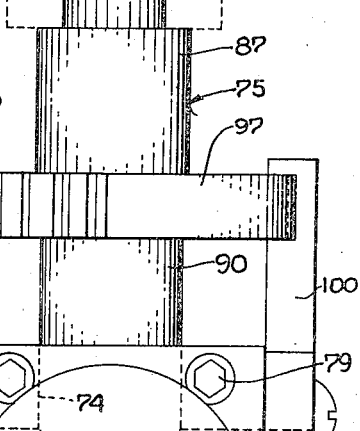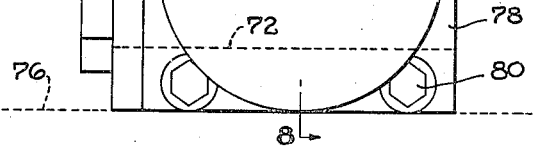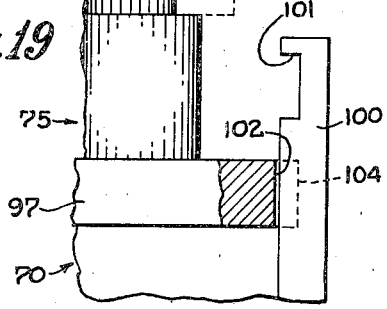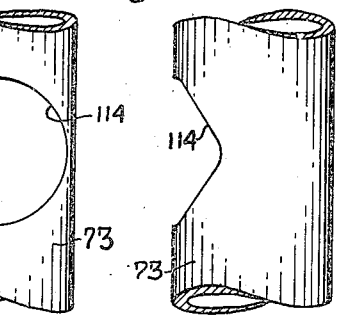

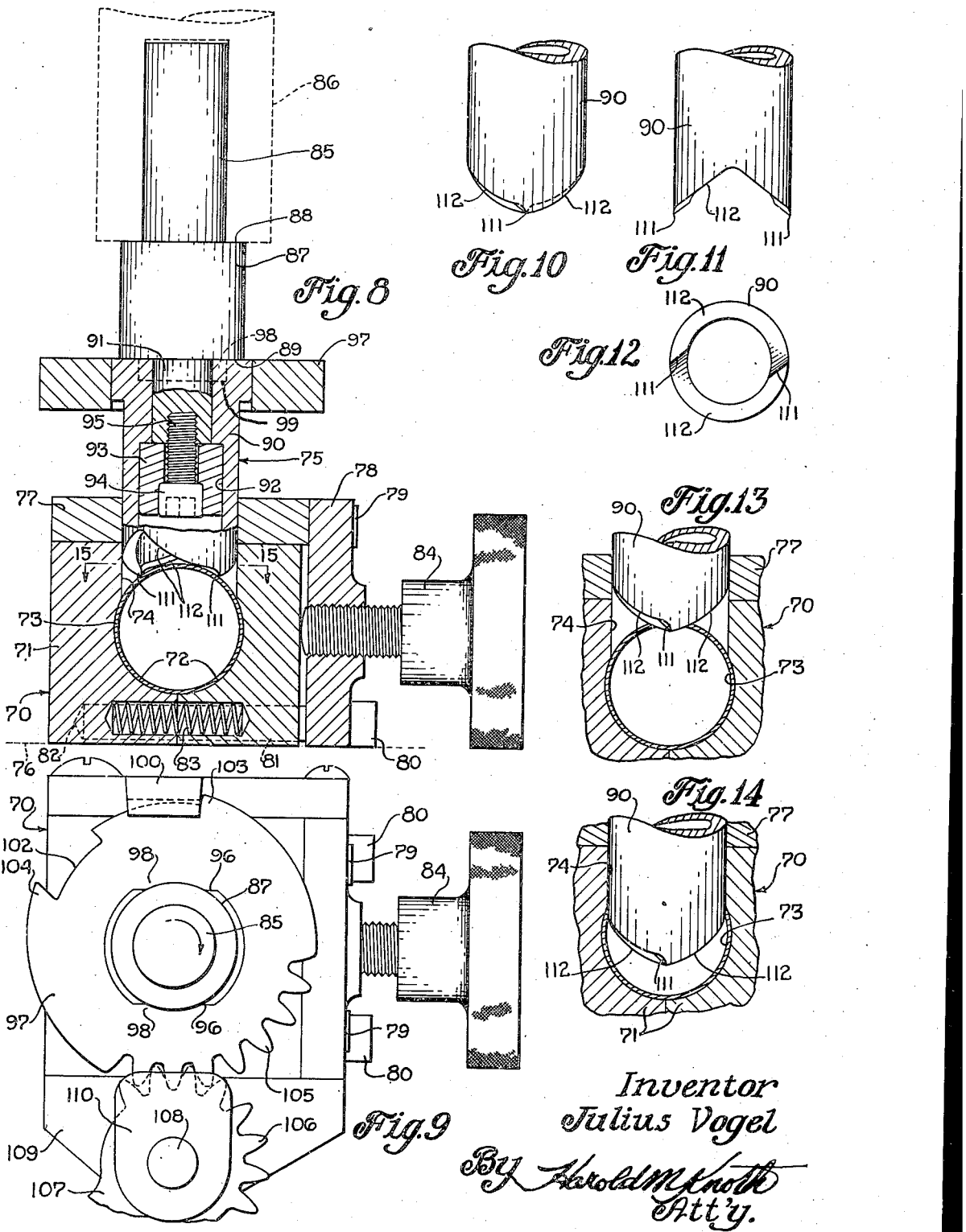

May 27, 1941.  J. VOGEL  2,243,614
APPARATUS AND METHOD FOR TREATING TUBULAR MEMBERS
Filed April 30, 1940  5 Sheets-Sheet 5
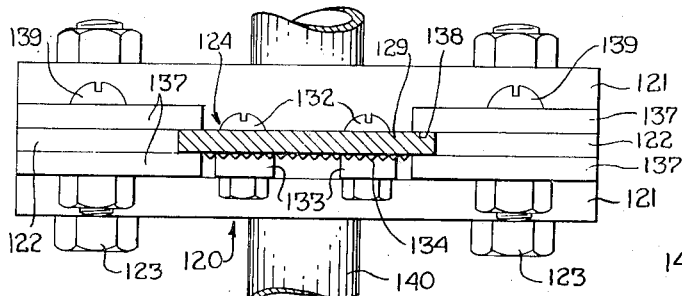
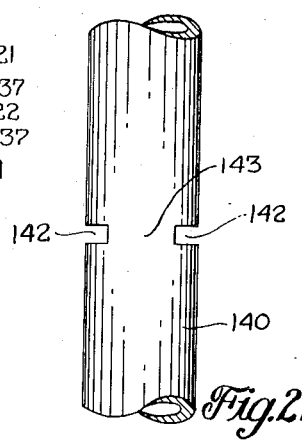
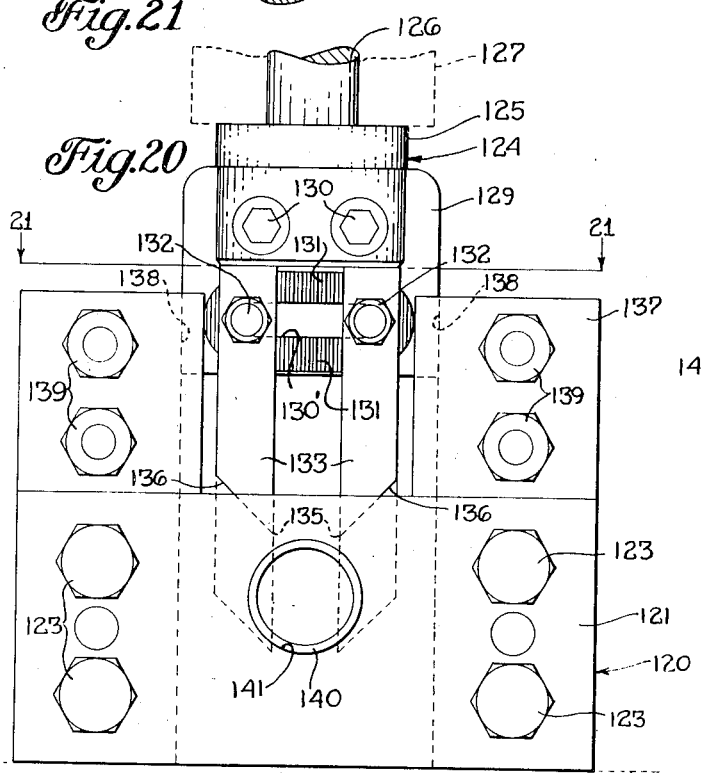
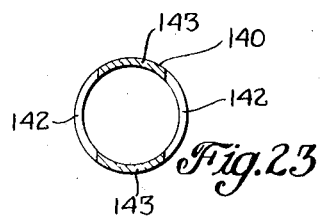
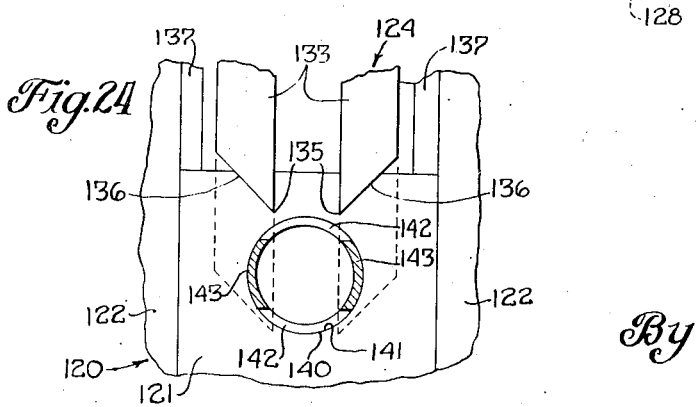
Inventor
Julius Vogel
By [signature]
Att'y.

Patented May 27, 1941

2,243,614

UNITED STATES PATENT OFFICE 2,243,614

APPARATUS AND METHOD FOR TREATING TUBULAR MEMBERS

Julius Vogel, Chicago, Ill.

Application April 30, 1940, Serial No. 332,614

25 Claims. (Cl. 164—48)

This invention relates to apparatus and method for cutting tubular members. More particularly the invention relates to means and method for cutting tubular members in sections, and means and method for forming openings in a wall portion of a tubular member.

The most difficult problems in the treatment of tubular members such as pipes are engendered by the nature of the pipe; that is to say, the pipe being hollow is subject to collapse whenever pressure as applied substantially diametrically thereacross. Accordingly, it has heretofore been necessary to provide means in the form of pilots or the like to support the pipe within its inside diameter while means were applied to its outside to cut the pipe.

The present invention contemplates broadly the method of cutting pipe comprising first depleting of a portion of the cross-sectional thickness of a wall and in this manner overcoming the inherent resistance offered by the wall to a means for cutting through the wall. When this resistance is thus overcome, the tendency to collapse the pipe is minimized. It is not necessary that any means be utilized for supporting the pipe from the inside.

The invention contemplates in one aspect the provision of apparatus and means for cutting straight across the pipe to cut the pipe in two sections. In another aspect the invention provides apparatus and method for forming an opening in a wall portion of the pipe intermediate the ends of the pipe.

Statement of the objects of the invention

The principal object of the invention is to provide apparatus and means as aforesaid for cutting or forming openings in pipe in the absence of inner supporting means and without collapsing the pipe.

An important object is to provide means for cutting across a wall section of the pipe generally in the direction of the extent of said wall section, whereby the cutting forces are not applied directly across a diameter of the pipe.

Another important object is to provide means engageable with a wall section of the pipe and movable substantially across a chord of the outer periphery of the pipe for the purpose of preliminarily cutting or depleting the wall thickness.

Another object is to provide an apparatus having means for cutting across the pipe to form a preliminary cut and means for cutting across the pipe at a substantial angle to the direction of the application of force on the first means.

Another object is to provide a cutting means having a plurality of cutting portions adapted to cut an opening in a wall portion of the pipe.

Other objects will appear as the disclosure is more fully made.

Description of the figures

Figure 1 is a side elevational view of a preferred form of apparatus for cutting tubular members into sections;

Figure 2 is a plan view of the same apparatus;

Figure 3 is a sectional view of the same apparatus taken substantially along the line 3—3 of Figure 2;

Figure 4 is a fragmentary view showing one step in the operation of cutting the tubular member;

Figure 5 is a similar view showing the completion of the operation;

Figure 6 is a view of a portion of a tubular member showing the cut as formed by the operation illustrated in Figure 4;

Figure 7 is a side elevational view of an apparatus for forming an opening in the wall section of a tube or pipe;

Figure 8 is a sectional view taken on the line 8—8 of Figure 7;

Figure 9 is a plan view of the apparatus illustrated in Figure 7;

Figures 10, 11, and 12 are separate views of the cutter, showing the cutter from two sides and in end elevation respectively;

Figures 13 and 14 are sectional views illustrating two steps in the operation of cutting the opening in the tube or pipe;

Figure 15 is a view of a portion of a pipe or tube showing the preliminary cutting portion of the cutter in position before making the preliminary cuts, the view being taken substantially along the line 15—15 of Figure 8;

Figure 16 is a similar view showing the position of the preliminary cutting portion after having formed cuts in the tube or pipe;

Figures 17 and 18 are respectively plan and side views of a portion of the tube showing the formation of the opening therein;

Figure 19 is a fragmentary sectional view showing the body member and guide means for the rotatable gear on the cutter;

Figure 20 is a front view of a modified form of apparatus for cutting tubular members into sections;

Figure 21 is a plan view of the same, partly in section, as viewed along the line 21—21 of Figure 20;

Figure 22 is an elevational view of a tubular member after the first operation has been performed;

Figure 23 is a transverse sectional view of the same; and,

Figure 24 is a partial view of the apparatus, showing the apparatus and the tubular member preparatory to performing the final operation.

*Description of the apparatus for cutting the tube in sections (Figures 1 to 6)*

As best shown in Figures 1 and 2 the cutting apparatus consists of a supporting member preferably composed of a pair of spaced apart plates 21, spaced apart by an upstanding member 22. The plates 21 and the member 22 are rigidly secured together by a plurality of bolts 23. The member 22 has secured respectively to opposite sides of its upper portions a pair of smaller plates 24, each having a transverse width greater than the width of the upper portion 22. The overlapping portions of the plates 24 provide a guide portion 25. The plates 21 are spaced apart at their opposite end portions by a longitudinal bar 26 cut out at its forward end at 27 to fit between the plates 21. A pair of plates 28 is rigidly secured to the supporting member 20 and the bar 26 respectively at opposite sides of the assembly. As best shown in Figure 2 the right-hand edges of the plates 28 form shoulders 29 adjacent the supporting member 20. The spaced apart plates 28 provide a transverse guideway 30 for carrying a transversely reciprocating cutter 31. The left-hand portion of this cutter consists of a toothed rack 32 engageable with a toothed portion 33 on a lever 34 pivotally mounted between the plates 28 on a transverse pin 35. The right-hand end portions of the plates 28 carry a transverse pin 36 on which is rotatably mounted a guide roller 37 formed with a peripheral groove. The reciprocating cutter member includes also a cutter 38 rigidly carried by the rack 32. The cutter is comparatively thin and is adapted to be guided by the peripheral groove in the roller 37. This cutter includes a cutting portion presenting a cutting edge 39 and the cutter tapers upwardly and away from the cutting edge at its upper and lower portions as at 40 and 41.

The supporting member 20 is provided with pipe or tube supporting means in the form of a pair of alined openings 42 formed respectively in the plates 21. For the purposes of illustration, the pipe supporting member is shown as supporting a cylindrical pipe or tube 43, the longitudinal axis of the pipe being coincident with the axis of the openings 42.

As previously mentioned, the right-hand end portion 27 of the bar 26 is substantially the same thickness as the upstanding member 22 so that the plates 21 are uniformly spaced apart, and the previously described guideway 25 is alined with the groove in the roller 37. The guideway 25 and groove in the roller are of the same dimensions as the spacing between the plates 21. Accordingly, a vertical guideway is provided for a vertical cutting member 44. This member consists of a hardened plate element carried for vertical movement in the guideway 25 and in the peripheral groove of the roller 37. The upper portion of the cutting member has secured thereto a shank 45 adapted to be fitted into the ram or operating member of a punch press or other similar apparatus. Such an apparatus is represented generally in dotted lines at 46 in the drawings. The assembly is adapted to be secured to the bed portion of an apparatus such as that referred to, as indicated generally by the broken line portion 47 in Figures 1 and 3.

As best shown in Figure 1, the apparatus includes means for engaging the pipe 43 to prevent the same from turning when the cutting forces are applied. This means consists of an arm 48 pivotally mounted at 49 on one of the plate members 28. This arm includes a portion extending to the right of the pivot 49 which carries pivotally thereon a clamp member 50 provided with a toothed edge adapted to grip the pipe 43. The arm extends at its left side where it is provided with a vertical stud 51 receiving one end of a coil spring 52. The other end of the spring 52 is carried by a stud 53 mounted on a pivoted arm 54 carried by a pin 55 passing through an ear 56 formed on the plate member 28. The same plate 28 is formed with a transverse slot 57. As best shown in Figures 1 and 2, the rack 32 carries an outwardly extending pin 58 engageable with the upper cam surface of the pivoted arm 54, so that when the rack is moved to the right the pin 58 rides over the cam surface of the arm, thus forcing the arm downwardly. The slot 57 accommodates the pin 58 during this movement. Downward pressure on the arm 54 results in increased compression on the spring 52 thus moving the arm 48 about its pivot 49 to urge the clamp member 50 into engagement with the pipe 43. The member 50 at its left-hand edge engages the shoulder 29 formed by the plate 28 and the plate member 21. The particular shape of the pipe-engaging portions of the member 50 provide for a wedging action as the member 50 is urged upwardly, the member being wedged between the left-hand portions of the pipe 43 and the right-hand shoulder 29. A tension spring 59 is secured at opposite ends respectively to the plate 28 and to the arm 48, and is provided for the purpose of returning the arm 48 to original position.

As best shown in Figures 1 and 4, the cutter 38, as previously mentioned, has the cutting portion 39 from which the remainder of the right-hand edge of the cutter recedes as at 40 and 41. The portions 40 and 41 are provided for the purpose of enabling the cutter 38 to have free movement into engagement with the pipe 43 without interfering with the vertically movable cutter 44 or that portion of the pipe 43 not desired to be cut. The cutter 38 and the cutter 44 are adapted to be operated separately, as illustrated in Figures 4 and 5 and as will hereinafter more fully appear.

The form of cut made in the pipe 43 by the cutter 38 is illustrated in Figure 6 at 60. A comparison of Figures 4 and 6 will indicate clearly that the cutter 38 depletes or cuts out a considerable wall portion of the pipe 43 across a chord of the outer periphery of the pipe, the cutting edge 39 first engaging the pipe at a point on its periphery intersected by the chord along which the cut 60 is made. In this manner no force is applied diametrically across the pipe 43 and the danger of collapsing the pipe is thus eliminated. Since the wall portion of the pipe is cut away as at 60, said wall is materially reduced in thickness and its inherent resistance to diametric pressure is overcome. Accordingly, when the cutter 44 is moved vertically the pipe is completely cut across.

In order to facilitate an efficient cutting action of the cutter 44 across the pipe 43, the cutting part of the cutter is provided with a sharp cutting point 61 from which recede at opposite sides thereof diverging cutting portions 62. The cutting point 61 easily penetrates the depleted wall section of the pipe 43 and the cutting portions 62, being curved as illustrated, enable the cutter 44 to pass easily through the remaining portion of the pipe 43. The curved portions 62 shear the pipe 43 outwardly respectively at opposite sides of a vertical diameter passing through the cut portion 60. Since the cutter 44 is comparatively thick, a slug will remain after the pipe 43 is cut across.

Description of the apparatus for forming openings (Figures 7 to 19)

As best shown in Figures 7 and 8 this apparatus consists of a carrier or supporting member 70 consisting of a pair of blocks 71 fitted together and respectively formed with arcuate recesses 72 which together form a substantially circular opening for receiving a pipe or tube to be cut. The pipe as illustrated in the drawings at 73 is circular in cross-section. Each of the blocks 71 is further provided with a vertically extending substantially semi-circular recess 74. The two recesses, when the blocks are assembled, provide a vertical bore in which is carried for reciprocation a cutting member generally designated at 75. The supporting member is adapted to be carried on the bed of a punch press or other like apparatus as indicated in broken lines at 76 in Figures 7 and 8.

A cross member 77 is disposed across the top of the blocks 71 being rigidly secured to the left-hand block. A vertical plate member 78 is rigidly secured at its upper end by a pair of bolts 79 to the cross member 77 and is further rigidly carried at its lower end by a pair of bolts 80. Each of the bolts 80 includes an unthreaded portion 81 passing loosely through the right-hand block 71 and a threaded portion 82 threaded into the left-hand block 71. The right-hand block 71 is thus slidably carried for movement with respect to the left-hand block. This relative movement provides for adjustment and clamping action between the blocks for carrying the tubular member or pipe 73. A compression spring 83 is respectively carried at opposite ends in bores formed respectively in the blocks. This spring tends to urge the blocks 71 apart. A hand screw 84 threaded into the vertical plate member 78 abuts the right-hand block 71. Movement of the screw in one direction moves the blocks together to clamp the pipe 73 in place. Release of the screw is followed by expansion of the spring 83 which moves the blocks apart so that the pipe 73 may be readily removed.

As best shown in Figure 8, the vertically reciprocable cutting member 75 consists of an upper shank portion 85 adapted to be carried in the ram of a punch press or like apparatus as illustrated diagrammatically at 86. An intermediate portion of the shank 85 is enlarged as at 87 to provide an upper shoulder 88 engaging the ram 86 and a lower shoulder 89 engaging the upper surface of a cylindrical cutter 90. The shank member 85 is further reduced at 91 and extends downwardly within the cutter 90. The lower portion of the cutter 90 is provided with a vertical bore 92 which bore is reduced to fit the reduced portion 91 of the shank 85. A collar 93 is fitted into the bore 92 of the cutter 90 and abuts the shoulder formed by the reduction in the cross-sectional area of the bore 92 and the bore into which is fitted the reduced portion 91 of the shank. The collar 93 is provided with a recess 94 for receiving the head of a screw 95 which is threaded into the reduced portion 91 of the shank 85. In this manner the cutter 90 and shank 85 are rigidly secured together.

As best shown in Figure 9, the upper portion of the cutter is provided at opposite sides with flat surfaces 96. A sector 97 provided with an opening corresponding to the shape of the upper end of the cutter 90 is fitted over said upper end. This sector is installed on the cutter before the cutter is assembled to the shank 85. The enlarged portion 87 of the shank overlaps the sector 97 at opposite sides of the opening therein, so that the shoulders 89 on the portion 87 abut the upper surface of the sector. This is best shown in Figure 9. As best shown in dotted lines in Figure 8, the sector is provided with a pair of diametrically opposed shoulder portions 98, only one of which is shown, engaging a shoulder 99 on the cutter 90. In this manner the cutter 90, the shank 85, and the sector 97 are rigidly secured together. It will be understood, of course, that the construction illustrated is only a preferred form of the invention and forms no part of the invention except in so far as it is illustrated for the purposes of disclosure. Accordingly any form of assembly of the parts 85, 90, and 97 may be utilized.

As best shown in Figures 7 and 19, the supporting member 70 of the apparatus carries an upstanding guide 100. This guide is provided at its upper portion with a groove or recess 101. The sector 97 is formed with a vertical groove 102 at a portion of its periphery. The sector is shaped to provide a stop portion 103 for engaging one side of the guide member 100. A second stop 104 is formed on the cutter adjacent the groove 102 for abutting the guide 100 at its outer side. When the sector 97 is in the position shown in Figures 7 and 8, the under surface thereof rests on the guide 100 at the lower portion of the groove 101 as will hereinafter more appear. The cutter is adapted to be rotated slightly, in which case the vertical groove 102 in the cutter becomes alined with the vertical extent of the guide 100 so that the sector 97 may be moved downwardly with respect to the guide.

A portion of the sector 97 is provided with teeth 105 adapted to be engaged by the toothed portions 106 of an arm 107 pivotally mounted on a vertical pivot pin 108 carried on a bracket 109 rigidly secured to the supporting member 70. The upper portion of the pin 108 is threaded and receives a rectangular nut 110 which in locked position overlaps the toothed portion of the sector 97. With the parts in the position shown in Figures 7 and 9, the sector 97 is held against vertical movement in either direction.

From the foregoing description it will be seen that angular movement of the arm 107 will result in a corresponding angular movement of the sector 97 so that the groove 102 in the sector will become alined with the guide 100. The stop 104 on the sector prevents movement of the sector 97 further than into a position wherein the groove 102 and the guide 100 will be alined. In this position of the sector 97 the cutting member 75 is adapted to be moved vertically, as will hereinafter more fully appear. A position of the cutter when moved downwardly is illustrated in Figure 19 to demonstrate the operation of the cutter as respects the cooperation between the sector 97 and the guide 100.

As best shown in Figures 10, 11, and 12, the cutter 90 has a lower cutting edge shaped to correspond generally with the shape of the particular opening to be formed. The cutting edge consists of a pair of diametrically opposed, peripherally positioned, preliminary cutting projections 111. A second pair of cutting portions is composed of a pair of diametrically opposed, peripheral cutting edges 112. It will be noted that each cutting edge 112 begins at one cutting projection 111 and extends peripherally of the cutter 90 and axially thereof about substantially one quarter of the periphery of the cutter; from thence the cutting edge 112 extends peripherally and axially toward the other cutting projection 111 for another one quarter of the periphery of the cutter. The other cutting edge 112, consisting of the receding and returning cutting portion, is similarly disposed about the other one-half of the periphery of the cutter 90. As best shown in Figure 8, the cutting projections 111 are adapted to engage the wall portion of the pipe 73 prior to downward movement of the cutter 90. In other words, the first movement of the cutter 90 is angularly about its axis, which axis is also the axis of reciprocation of the member 75. Since the cutter 90 is tubular, particularly efficient cutting edges are provided at the edge thereof. The end portion of the cutter is cut back radially inwardly to provide the sharpened peripheral cutting portions 112. The cutting projections 111 are similarly sharpened as shown in Figures 8 and 11. The entire cutting end of the cutter is, of course, hardened by any suitable process.

Figures 15 and 16 illustrate the preliminary steps in the operation of the apparatus shown in Figures 7, 8, and 9. Figure 15 is a diagrammatic view taken substantially along the line 15—15 of Figure 8. In this figure the diametrically opposed preliminary cutting projections 111 are shown disposed respectively at opposite sides of a vertical plane passed through the longitudinal axis of the pipe 73. The positions of the cutting projections 111 are those assumed before the cutting operation begins. The first operation in cutting the opening in the pipe consists of angular movement of the cutter 90, effected by angular movement of the arm 107 which results in angular movement of the sector 97. This angular movement is continued until the stop 104 on the sector engages the left-hand edge of the guide 100. When the sector has reached this position the cutting projections 111 have moved to the positions shown in Figure 16, and during their travel these projections have formed the preliminary cuts 113. The punch press or other motivating apparatus is then operated to move the cutting member 75 downwardly. This movement of the cutter is across a diameter of the pipe disposed at an angle to the chord across which each of the cutting projections 111 have preliminarily moved. It will be understood, of course, that the recesses 113 are slightly arcuate but the general direction of the movement of the cutting projections 111 in the preliminary step is substantially across chords of the outer periphery of the pipe spaced axially on the surface of the pipe. After this preliminary movement the cutter 90 is in the position shown in Figure 13, wherein the cutting projections 111 are diametrically opposed in a vertical plane passed through the axis of the pipe 73. Downward movement of the cutting member 75 moves the cutter to the position shown in Figure 14. During this movement the cutting edges 112 cut a circular opening 114 in the pipe, as shown in Figures 17 and 18.

Description of the modified apparatus for cutting the tube in sections (Figures 20 to 24)

The apparatus to be presently described is a modified form of that shown in Figures 1 to 6. As best shown in Figures 20 and 21, the apparatus at present under consideration consists of a lower pipe-carrying element 120 consisting of a pair of spaced apart plate members 121, secured together in spaced apart relation by a pair of upstanding members 122. The members 121 and 122 are rigidly secured together by a plurality of bolts 123. The relation between the parts 121 and 122 is such as to space the intermediate portions of the members 121 apart for the purposes of receiving a cutting member carried by a vertically reciprocable cutting element 124. This cutting element is in the form of a punch member 125 having a shank 126 adapted to be mounted in the ram or plunger of a punch press or its equivalent, as generally indicated at 127. The pipe-carrying element 120 is adapted to be mounted on the bed of a punch press or similar apparatus represented in dotted lines at 128. The cutting element also carries a transverse plate member 129 rigidly secured by bolts 130 to the punch member 125. The lower portion of the plate member 129 is provided with a transverse slot 130 and the surface of the member at opposite sides of the slot is serrated as at 131. The slot 130 is adapted to receive a pair of locking bolts 132, each of which carries a vertically extending cutter 133. The inner surface of each cutter is serrated as at 134 and cooperates with the serrations 131 on the member 129 for holding the cutters 133 securely in position. The cooperation between the slot 130 and the bolts 132 provides adjustable means enabling the cutters 133 to be spaced more closely or farther apart for the purpose of accommodating different sizes of pipe.

Each cutter 133 is provided with a first cutting edge 135, from which edge a shearing portion 136 extends upwardly and outwardly toward the outer edge of the cutter. The function of the cutting and shearing portions will be described in conjunction with the description of the method of cutting pipe. Each of the upstanding members 122, heretofore referred to as spacing apart the plates or members 121, carries a pair of guide plates 137, each of which as best shown in Figure 21, extend inwardly beyond the inner edge of the respective member 122 and together provide a groove 138 adapted to receive one side of the plate member 129 forming part of the cutting element 124. The relation of the parts is such to provide a vertical guideway in which the cutting element may reciprocate. The guide plates 137 are rigidly secured respectively to the members 122 by bolts 139 and no adjustment need be made when the cutters 133 are adjusted.

The pipe-carrying element 120, consisting of the members 121, is provided with an opening for carrying a pipe or other tubular member generally indicated at 140. For this purpose each of the members 122 is provided with an opening 141, the openings being alined and adapted to receive the pipe 140. Since the members 122 are spaced apart, a portion of the pipe 140 is exposed to the cutter intermediate the members 122 so that a shearing action is effected by the shearing portion 136 and the cutters 133.

The vertical reciprocation of the cutting element 124 is indicated generally in dotted lines in Figure 20, wherein it is illustrated that the cutters cut across the pipe generally along spaced chords of the outer periphery of the pipe; or, in other words, the cutters 133 cut opposed wall portions or segments from the pipe leaving diametrically opposed cuts or recesses 142. This is best illustrated in Figure 22, at the same time diametrically opposed wall portions 143 remain in the pipe and must be cut before the cutting operation is complete. In order to accomplish this objective the pipe 140 is rotated 90 degrees in the openings 141 in the plates 121. The pipe 140 then assumes the position shown in Figure 24, wherein it is shown that the diametrically opposed remaining wall portions 143 are disposed immediately below the cutters 133. Another reciprocation of the cutting element moves the cutters 133 to cut these wall portions out of the pipe, the cutters moving to the dotted line position in Figure 24. Thus, the intermediate sections of the peripheral wall are removed by strokes of the cutting element 124. The movement of the cutters 133 across the pipe or tubular member is such as to eliminate any possibility of crushing the pipe. This feature of the invention is produced by the circumstance of the spacing apart of the cutters 133 so that the pipe or member is cut at spaced portions lying in a plane passing through the pipe or member at right angles to its axis. The cuts are sufficiently spaced apart from the true diameter of the pipe periphery so that the force applied by the cutting element 124 is such as to direct itself substantially through the general extent of the immediate wall portion. The same function is obtained when the pipe is rotated 90 degrees for the purpose of making the second cut.

From the foregoing description of the apparatus it will be seen that the broad conception of the invention consists in first cutting across the wall of a tubular member in the general direction of a chord of the outer periphery of the member; or in other words, the first cut preparatory to cutting across the pipe or partially across the pipe, is made on a chord near the outer surface of the pipe; and this is true whether the pipe be circular or shaped otherwise in cross section. In both instances the invention provides apparatus and method for preliminarily cutting through a portion of the wall section of the pipe. In neither instance is it necessary to support the pipe from the inside. The elimination of this additional supporting means is made possible by the direction of movement of the first cut, or cuts, wherein the force is initiated at the outer surfaces of the pipe and moves on a chord across the pipe. The elimination of the inner supporting means is an important feature of the invention since in many instances cuts or openings to be formed in tubular members are disposed at such positions with respect to the ends of the members that inner supporting means cannot be utilized practically. In such cases resort must be had to more expensive means of cutting the pipe, such as sawing, milling, or torch-cutting.

The particular advantages and features of the present invention will be made apparent from an examination of the speed and facility with which the cuts may be made in the tubular members. In either apparatus a first movement of the cutting means makes a preliminary cut; and a second movement completes the operation. The particular apparatus illustrated provides for the accommodation of both cutting means in the same device, so that both cuts may be made while the pipe or member is in position. This feature eliminates many fabrication problems.

It will be appreciated that the foregoing description is of a preferred embodiment of the invention and that numerous modifications and alterations may be made therein without departing from the spirit and scope of the invention as set forth in the appended claims.

What is claimed is:

1. The method of cutting cylindrical pipe comprising cutting a portion of the wall of the pipe substantially along a chord of the outer periphery of the pipe by a cutting force initiated from a point on the surface of the pipe intersected by the chord, and then cutting across the pipe by a cutting force initiated at the first cut in a direction at an angle to the chord.

2. The method of cutting cylindrical pipe comprising cutting a portion of the wall of the pipe substantially along a chord of the outer periphery of the pipe by a cutting force from an initial point on the surface of the pipe to a point on the chord designated by the intersection of the chord with a diameter of the pipe at an angle to said chord, and then cutting the pipe by a cutting force in the direction of that diameter.

3. The method of cutting an opening intermediate the ends of a cylindrical pipe, comprising cutting axially spaced wall portions respectively substantially along axially spaced chords of the outer periphery of the pipe by cutting forces initiated respectively at points on the outer surface of the pipe respectively intersected by the chords, and then cutting the pipe partially across by cutting forces initiated at said points and proceeding across the pipe at an angle to the direction of the first cutting forces.

4. The method of cutting an opening intermediate the ends of a cylindrical pipe, comprising cutting a pair of axially spaced recesses in the pipe wall by cutting forces applied generally in the direction of respective chords of the outer periphery of the pipe included respectively in the particular recesses, and then applying a cutting force across the pipe from said recesses at a substantial angle to the direction of the first cutting forces.

5. The method of cutting a longitudinal tubular member, comprising cutting a portion of the wall of the member in a direction generally tangentially of the periphery of the member, and then cutting across the member by a cutting force initiated at the first cut portion and applied at an angle to the first direction for cutting across the member.

6. The method of cutting an opening in a longitudinal tubular member intermediate its ends, comprising forming recesses in a wall portion of the member at longitudinally spaced points by cutting forces applied generally tangentially of the outer periphery of the member at said points, and then applying a cutting force from said recesses at a substantial angle to the direction of the first cutting forces.

7. The method of forming a circular opening in a tube wall comprising rotating opposed peripheral axial cutting extensions of a cylindrical cutter of a diameter of the opening to be formed into tangential contact with the tube to form preliminary cuts spaced axially on the tube, and moving the cutter axially to cause receding peripheral cutting portions intermediate the extensions to cut through the tube wall between the preliminary cuts.

8. The method of cutting an opening in a wall portion of a cylindrical pipe, comprising depleting the thickness of the wall portion at axially spaced portions of the surface thereof along spaced chords of the outer periphery of the pipe by force initiated from points beginning respectively at intersections by the surface of the chords, and then forming the remainder of the opening by cutting force applied in a direction at an angle to the chords and initiated at the depleted portions for cutting the pipe partially across.

9. The method of cutting an opening in a wall portion of a cylindrical pipe comprising depleting the thickness of the wall portion at axially spaced portions on the surface thereof by cutting force applied respectively along spaced chords of the outer periphery of the pipe, and then forming the remainder of the opening by cutting force applied in a direction at an angle to the chords and initiated at the depleted portions for cutting the pipe partially across.

10. The method of cutting a circular opening through the wall of a tube comprising rotating a cylindrical cutting tool of the same diameter as the opening to be formed about an axis coincident with the axis of the opening to be formed and bringing diametrically opposed projections on the end of the tool into contact with the tube to form preliminary cuts generally tangentially across the wall of the tube on the circle of said opening, and then moving the tool along its axis to bring intermediate cutting portions into contact with the tube to cut the wall about a portion of the periphery of the tube from the preliminary cuts continuously about the remainder of said circle.

11. Apparatus for cutting cylindrical pipe, comprising cutting means movable transversely of the pipe for cutting a portion of the wall of the pipe substantially along a chord of the outer surface of the pipe initiated from a point on the surface of the pipe intersected by the chord, and means movable with respect to the pipe in a direction at an angle to and initiated at the chord for cutting across the pipe.

12. Apparatus for cutting a longitudinal tubular member, comprising cutting means movable generally tangentially of the periphery of the member for cutting a wall portion of the member, and means movable with respect to and across the member in a direction at an angle to the first direction for cutting across the member.

13. Apparatus for cutting an opening in a wall portion of a cylindrical pipe, comprising means for cutting a wall portion of the pipe at axially spaced portions of the surface thereof, said means being movable relative to the pipe substantially along spaced chords of the outer periphery of the pipe from points beginning respectively at intersections of the surface and the chords, and cutting means movable with respect to the pipe in a direction at an angle to and initiated at the chords for cutting the pipe partially across.

14. Apparatus for cutting an opening intermediate the ends of a cylindrical pipe, comprising means for cutting a pair of axially spaced recesses in the pipe wall, said means being movable with respect to the pipe generally in the direction of respective chords of the outer periphery of the pipe included respectively in the particular recesses, and means movable with respect to the pipe at a substantial angle to the direction of the first cutting means for cutting across the pipe from said recesses.

15. Apparatus for cutting a circular opening through a wall of a tube, comprising a cylindrical cutting tool of the same diameter as the opening to be formed rotatable about and reciprocal along an axis coincident with the axis of the opening to be formed, said tool having diametrically opposed cutting projections on its end adapted to cross the tube as the tool is rotated to form preliminary cuts generally tangentially across the wall of the tube on the circle of said opening, said tool being provided with intermediate cutting portions extending about its periphery adapted when reciprocated to cut the wall of the tube about a portion of the periphery of the tube from the preliminary cuts continuously about the remainder of said circle.

16. Cutting apparatus comprising a carrier member, a cutter having a cylindrical body mounted in the member for reciprocation along and angular movement about its axis, a first pair of cutting portions projecting axially from one end of the cutter at diametrically opposed points on the periphery of said end, and a second pair of cutting portions extending respectively about portions of the periphery of said end, each connecting a first cutting portion, means for reciprocating the cutter, and means for moving the cutter angularly about its axis.

17. Cutting apparatus comprising a carrier member, a cutter having a body mounted in the member for reciprocation along and angular movement about its axis, a first cutting portion projecting axially from one end of the cutter on the periphery of said end, and a second cutting portion extending about a portion of the periphery of said end and connecting the first cutting portion, means for reciprocating the cutter, and means for moving the cutter angularly about its axis.

18. A cutter comprising a cylindrical body having one end provided with a cutting portion consisting of a cutting edge beginning at one end of the body at the surface thereof, extending about the surface and toward the other end of the body for substantially one-quarter of the circumference of the body, extending thence about the surface and toward the first end of the body for substantially another quarter of the circumference thereof to a point diametrically opposite the beginning point, and extending thence similarly about the other two quarters of the circumference and returning to the beginning point, said cutting portions being provided at each of the aforesaid diametrically opposed points with a projecting cutter having a cutting edge extending at an angle to the immediate portion of the first cutting edge.

19. A cutter comprising a cylindrical body having one end provided with a cutting portion consisting of a cutting edge beginning at one end of the body at the surface thereof, extending about the surface and toward the other end of the body for substantially one-quarter of the circumference of the body, extending thence about the surface and toward the first end of the body for substantially another quarter of the circumference thereof to a point diametrically opposite the beginning point, and extending thence similarly about the other two quarters of the circumference and returning to the beginning point, said cutting portions being provided at each of the aforesaid diametrically opposed points with a projecting cutter having a cutting edge extending at an angle to the immediate portion of the first cutting edge, said last named cutting edges facing in opposite directions.

20. A cutter comprising a cylindrical body having one end provided with a cutting portion consisting of a cutting edge beginning at one end of the body at the surface thereof, extending about the surface and toward the other end of the body for substantially one-quarter of the circumference of the body, extending thence about the surface and toward the first end of the body for substantially another quarter of the circumference thereof to a point diametrically opposite the beginning point, and extending thence similarly about the other two quarters of the circumference and returning to the beginning point.

21. The method of cutting a cylindrical pipe comprising cutting diametrically opposed wall portions of the pipe respectively along two parallel chords of the outer periphery of the pipe, each of a length less than the diameter of the pipe, by cutting forces initiated respectively at points on the surface of the pipe intersected by the chords, and then cutting across the pipe by cutting force initiated at a point in one of the first cuts and at an angle to the chords.

22. The method of cutting a cylindrical pipe comprising cutting diametrically opposed wall portions of the pipe respectively along two parallel chords of the outer periphery of the pipe by cutting forces initiated respectively at points on the surface of the pipe, each chord being spaced inwardly from the adjacent surface portion of the pipe a distance slightly greater than the thickness of the pipe wall, and then cutting across the pipe by cutting force initiated at a point in one of the first cuts and at an angle to the chords.

23. The method of cutting a longitudinal tubular member comprising cutting opposed wall portions thereof by cutting forces initiated respectively at transversely spaced points on the outer surface of the member and proceeding along parallel cutting lines through the member to cut out opposed wall portions, and then cutting across the member by cutting force initiated at one of the first cuts and applied at an angle to the direction of the aforesaid cutting lines.

24. The method of cutting a longitudinal tubular member comprising cutting transversely opposite wall portions of the member along transversely spaced, substantially parallel lines lying in a plane passed transversely through the pipe by cutting forces initiated respectively at points on the surface of the member intersected by said lines, and then cutting across the pipe by cutting force initiated at a point in one of the first cuts and at an angle to the aforesaid lines.

25. The method of cutting a cylindrical pipe comprising shearing a pair of diametrically opposed segments from the wall of the pipe by shearing force transversely of the pipe and then shearing the remaining wall portions by shearing force applied at an angle to the first shearing force and in the same plane.

JULIUS VOGEL.

DISCLAIMER 2,243,614.—*Julius Vogel*, Chicago, Ill. Apparatus and Method for Treating Tubular Members. Patent dated May 27, 1941. Disclaimer filed August 25, 1942, by the patentee.

Hereby enters this disclaimer to claims 1, 2, 5, 11, 12, 21, 22, 23, 24, and 25.

[*Official Gazette September 15, 1942.*]